United States Patent [19]
Myers

[11] 3,740,861
[45] June 26, 1973

[54] METHOD FOR DRYING CARBON BLACK PELLETS

[75] Inventor: Claude V. Myers, El Dorado, Ark.

[73] Assignee: Cities Service Company, New York, N.Y.

[22] Filed: June 17, 1970

[21] Appl. No.: 47,085

[52] U.S. Cl. .................. 34/10, 34/57 A, 34/57 R
[51] Int. Cl. ........................................ F26b 3/08
[58] Field of Search ............... 34/17, 10, 68, 57 D, 34/57 R, 133, 132, 108, 130, 135, 142, 60, 69, 90; 263/32 R, 21 A

[56] References Cited
UNITED STATES PATENTS

| | | | |
|---|---|---|---|
| 245,980 | 8/1881 | Smith | 34/133 |
| 2,117,822 | 5/1938 | Pehrson et al. | 34/10 |
| 3,238,634 | 3/1966 | Goins | 34/10 |
| 3,282,577 | 11/1966 | Cottle | 34/57 R X |
| 3,469,323 | 9/1969 | Jongbloed et al. | 34/57 R X |
| 3,513,560 | 5/1970 | Lamare | 34/10 |

Primary Examiner—William F. O'Dea
Assistant Examiner—William C. Anderson
Attorney—J. Richard Geamam

[57] ABSTRACT

Wet pellets of carbon black are dried to produce dry pellets by means of a two-step process. In the first step a bed of wet pellets is fluidized by means of a heated gas and the pellets are thus partially dried. In the second step the partially dried pellets from the first step are subjected to additional drying while in a nonfluidized state, e.g. pellets from the fluidized bed are heated and subjected to a mild, mechanically produced tumbling action during the second step.

12 Claims, 1 Drawing Figure

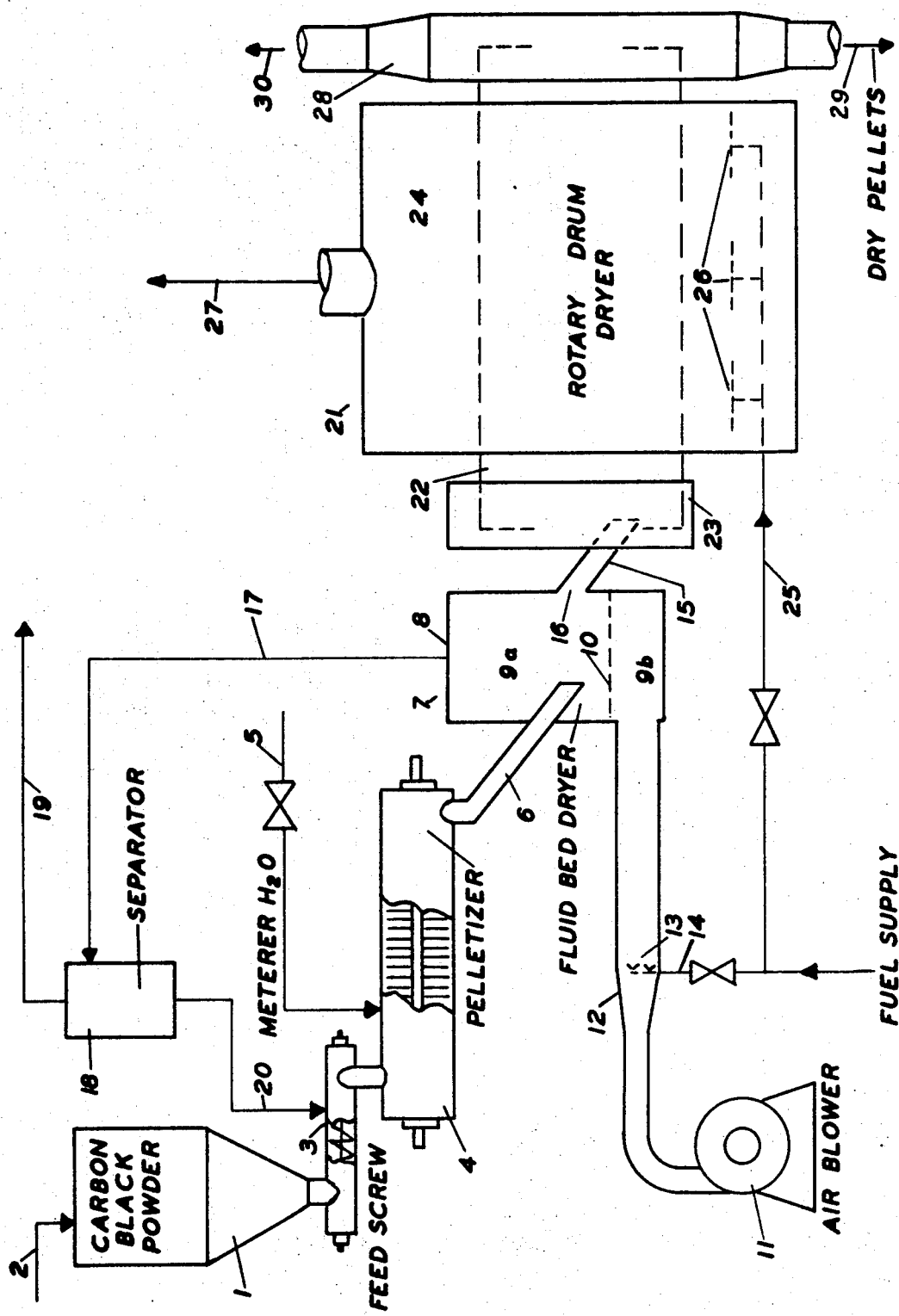

METHOD FOR DRYING CARBON BLACK PELLETS

BACKGROUND OF THE INVENTION

Freshly manufactured carbon black powder is pelletized to increase the bulk density thereof, thus making it easier to handle and more economical to ship. "Wet pelletizing" processes are most commonly employed wherein an aqueous pelletizing medium and the carbon black powder are mixed together and tumbled to form wet pellets which contain 35–60 weight percent of water. The pellets must then be dried to provide a dry, pelletized product which contains less than about 10 weight percent of water, and more commonly less than one weight percent thereof.

The conventional method for removing water from wet carbon black pellets is by means of an indirectly fired rotary drum dryer, since it handles the pellets very gently and is mechanically dependable. However, one of the problems associated with such dryers is the difficulty in maintaining control of the drying operation as the throughput of wet pellets is increased beyond certain limits, for in such cases it becomes proportionately harder to maintain a uniform temperature profile throughout the drier, or to maintain temperatures within the necessary limits, commonly 325°–450°F. As a consequence the pellet drying process can become a "bottleneck" when it is otherwise possible to increase the production rate in the carbon black manufacturing operation.

Efforts have been made to increase the rate at which carbon black pellets can be dried by employing fluidized bed driers since they provide high drying capacities and efficiencies relative to their size. They are also smaller physically than rotary drum dryers of equal capacity. Such efforts have been largely unsuccessful, however, since fluidized bed processes are inclined to damage the friable carbon black pellets, i.e. because of the extreme mobility of the pellets within the bed, they can be quickly broken up by repeatedly colliding with one another.

SUMMARY OF THE INVENTION

It is therefore an object of the present invention to increase the rate at which wet pellets of carbon black can be dried while, at the same time, minimizing damage to the pellets. Other objects and advantages of the invention will become apparent from the following description and the appended claims.

In accordance with the present invention, wet carbon black pellets are dried by means of a two step process, the first of which amounts to partial drying of the pellets in a fluidized bed, this being followed by a subsequent step wherein the pellets are further subjected to drying conditions while in a nonfluidized state. By means of this procedure, the advantages of high efficiency and high capacity which are inherent in a fluid bed process are largely retained without excessive damage to the pellets, for it has been discovered that most of the damage which results from drying the pellets in a fluid bed does not occur until a substantial portion of the water has been evaporated therefrom. In the present invention, therefore, the pellets are only partially dried by means of a fluidized bed procedure, this being in contrast to the prior art, since fluid bed drying has heretofore been employed for substantially complete evaporation of moisture from the pellets.

The amount of water which can be safely removed from the wet pellets by means of a fluidized bed in accordance with the present invention is subject to variation, but it should never approach substantially total removal of moisture, and as a general rule the pellets should be removed from the fluidized bed while they still have a moisture content of not less than about 20 weight percent.

It is, of course, desirable to achieve as much of the drying as possible by means of a fluid bed and the extent to which this is practical in any given case can be determined by experimentation. Generally, no more than about 10 weight percent (dry basis) of the pellets should be converted to dust which becomes entrained in the fluidizing gas and is thus lost from the bed.

After partial drying in the fluidized bed, the pellets are subjected to additional drying while in a nonfluidized state, as previously indicated. The term "fluidized bed" as used herein is intended to mean that the wet pellets are suspended within a stream of heated gases and are thus caused to behave as a fluid, while the velocity of the fluidizing gas is maintained low enough nonetheless, to prevent substantial entrainment and loss of the pellets from the fluidizing zone. The term "nonfluidized" is thus intended to mean that the pellets are not suspended or conveyed by means of a gas stream. Therefore, the term "nonfluidized" can be applied to a static bed or to mild, mechanically-produced tumbling of the pellets in a bed such as is achieved, for instance, by means of a rotary drum drier, a rotary tray drier or a rotary rake dryer.

In accordance with the present invention the throughput of a mechanical dryer can be greatly increased, e.g. 25–50 percent, without hendering the ability to control the temperature of the drying operation. It will also be appreciated that the invention can be employed to advantage in existing operations wherein a rotary drum dryer is already being employed, i.e. a relatively simple and economical fluid bed drier can be installed ahead of the drum to considerably increase the throughput rate of the latter.

Fluidization of wet carbon black pellets in the present invention can be accomplished by means of conventional apparatus and methods for producing fluidized beds of particulate solids. As previously indicated, partial drying of the pellets in the first step is achieved by contact with a heated gas which is passed through a bed of pellets to achieve a state of fluidization. After passing through the bed, the moisture-ladened gas can be conveyed to a separator for removal of any carbon black dust therein and the cleaned gas can then be expended or utilized in some other phase of the carbon black manufacturing process.

The type of gas employed for forming the fluid bed of the pellets is subject to considerable variation, but in the ordinary case it will be substantially nonreactive with the carbon black at the conditions employed for fluidization. Some gases which can be employed for the purpose include heated air, air mixed with the hot products of burning a fluid fuel with a free-oxygen containing gas, and flue gases produced in the carbon black reactor during manufacture of the black. Satisfactory results can be obtained when the fluidizing gas has a temperature within the range of about 700°F to about 1,200°F when introduced into the bed of wet pellets. Lower or higher temperatures can be employed, but lower temperatures will, of course, reduce the drying rate, and there is some danger of excessive damage to the pellets and detrimental chemical reaction between the black and the gas if higher temperatures are employed. When the gas is introduced into the pellet bed at a temperature within the aforesaid range, the temperature of the fluidized bed can be maintained within the range of about 130°F to about 160°F to achieve a very high drying efficiency.

Since the resulting temperature of the fluidized bed is more or less independent of its height, the relatively deep bed normally used in fluidized bed drying operations is not required in the present invention. A bed depth of 6 to 12 inches can be employed to advantage while employing a bed depth to cross-sectional area ratio within the range of about 1 ft./12 sq. ft. to about 1 ft./24 sq. ft. The ability to employ such a shallow fluidized bed provides the advantage of a lower pressure requirement for the fluidizing-drying gas while also reducing attritioning of the pellets within the bed.

In accordance with this invention the residence time of the pellets within the first and the subsequent drying stages can be established to provide a much shorter duration in the fluidizing bed than is utilized for the subsequent, nonfluidized step, thereby minimizing attritioning of the pellets while still providing a substantial increase in the drying rate. The time of exposure to drying conditions in the first step can, for instance, be within the range of about 5 minutes to about 10 minutes while employing an exposure time of about 20 minutes to about 30 minutes in the subsequent step. Generally, temperatures within the range of about 250°F to about 500°F are maintained during the subsequent, nonfluidized step wherein the pellets are finally dried to a moisture content of less than one weight percent.

BRIEF DESCRIPTION OF THE DRAWING

The drawing is a somewhat diagrammatical, partly sectional flowsheet which depicts one embodiment of the present invention.

DESCRIPTION OF THE PREFERRED EMBODIMENTS

With reference to the drawing, freshly produced carbon black powder is fed into a dense tank 1 through line 2 and is then conveyed at a constant rate into a carbon black wet pelletizer 4 by means of a feed screw 3. Water, or an aqueous pelletizing medium, is fed into the pelletizer at a constant rate through line 5. The mixture of water and carbon black is tumbled within the pelletizer to produce wet pellets which are discharged through conduit 6 into a fluid bed dryer, generally represented at 7. The fluid bed dryer comprises an enclosure 8 which bounds an upper chamber 9a and a lower chamber 9b separated by a perforated gas-distribution plate 10. The wet pellets which are discharged into the fluid bed dryer form a bed which resides above the distribution plate. This bed of wet pellets is fluidized and dried by forcing a heated gas through plate 10 from chamber 9b. In the illustrated case air is forced into chamber 9b and through plate by means of a blower 11 and an interconnecting duct 12. Duct 12 is provided with a burner 13 to which fuel is supplied at a metered rate through line 14. Combustion of the fuel at burner 13 liberates heat into the air passing through duct 12 so that the bed of wet carbon black pellets residing above plate 10 is thus fluidized and partially dried. As an alternative, the air which is conveyed into chamber 9b can be heated by means of a tube and shell heat exchanger, not shown.

In the illustrated operation, wet pellets continuously enter the fluid bed dryer through conduit 6 while partially dried pellets continuously discharge from the bed through conduit 15. The fluidized bed of pellets therefore resides above plate 10 and below the outlet 16 of the dryer. Moisture-ladened fluidizing gas is expended from the enclosure 8 through line 17. The gas from line 17 can be discharged into a solids separator 18, e.g. a cyclone, for removal of carbon black dust, and the cleaned gas can then be expended or passed back to a carbon black collection system through line 19. Carbon black dust which is removed from the gas by the separator can be passed into the feed screw 3 through line 20.

After partial removal of moisture in the fluidized bed dryer 7, the wet pellets pass into a mechanical dryer for substantially complete removal of moisture which remains therein. The mechanical dryer can be a tray or tunnel dryer; but, to advantage, a rotary drum dryer as illustrated at 21, can be employed. The partially dried pellets from the fluid bed dryer enter the rotary drum 22 through conduit 15. The inlet end of the drum is provided with a hood 23 which seals the interior from the atmosphere. The greater portion of the length of the drum is enclosed by a shell 24 which guides hot gases over the exterior of the drum so that the contents thereof are heated indirectly. These hot gases are produced by burning fuel from line 25 at the burners 26, and are expended from the dryer shell through line 27. Dried carbon black pellets discharge from the drum 22 into hood 28 and are removed through line 29 to a packaging operation. Moisture vapor from the dryer drum is removed through line 30 and is thence passed to a separator for removal of any carbon black dust therein, e.g. by means of the separator represented at 18.

EXAMPLE I

Using an apparatus arrangement substantially as shown in the drawing, wet carbon black pellets were produced by means of the wet pelletizer at the rate of 5,240 lbs. per hour, the water content of the pellets being 49.3 weight percent. These wet pellets were discharged directly into a fluid bed dryer of rectangular cross-section and having dimensions of 3 ft. wide × 4 ft. deep × 8 ft. high. The air distribution plate was perforated with 1/16 inch diameter holes ¼ inch centers. The bottom of the pellet outlet was located 8 inches above the distribution plate, thus providing a fluidized bed depth of 8–10 inches. Air, heated by means of a duct burner, was introduced into the fluidized bed at a temperature of 700°F and at the rate of about 1,800 SCFM. In the fluid bed dryer, the pellets were partially dried to a moisture content of 34 weight percent, thus reducing the water content by about 47 percent. The partially dried wet pellets were then heated to a temperature of about 450°F during passage through the rotary drum (5 ft.D. × 50 ft.L.) and were thus dried to a moisture content of about 0.5 weight percent.

What must be emphasized is that the capacity of the rotary dryer in this operation was limited to the evaporation of no more than about 1,835 lbs. per hour of water. By the herein prescribed use of a fluidized bed dryer in conjunction with a rotary dryer, the capacity of the drying system was increased by 40 percent, i.e. to about 2,585 lbs. of water per hour, while preserving pellet quality and maintaining control of the drying temperatures.

During this drying operation less than 10 weight percent (dry basis) of the pellets was entrained as dust in the effluent gas stream from the fluid bed dryer. The dust was separated by means of a cyclone separator and was then returned to the pelletizer via the feed screw for reconversion to wet pellets.

While the invention has been described with reference to particular conditions, materials, proportions, apparatus arrangements and the like, it will be understood that various changes and modifications can be made which are within the spirit and scope of the invention as set forth in the appended claims.

Therefore, what is claimed is:

1. In a process for drying wet pellets of carbon black while employing fluidized bed drying, the method for reducing conversion of the pellets to dust which comprises:
    a. fluidizing a bed of wet carbon black pellets with a heated gas and partially drying the fluidized pellets to a moisture content of not less than about 20 weight percent by contact with the gas, and
    b. further drying the partially dried pellets while they are in a substantially nonfluidized state.

2. The method of claim 1 wherein a bed of the partially dried pellets is heated and subjected to a mild, mechanically-produced tumbling action during said subsequent step.

3. The method of claim 1 wherein said bed of pellets is heated and tumbled by passing the partially dried pellets to and through the rotary drum dryer.

4. The method of claim 1 wherein the gas by means of which the bed of wet pellets is fluidized is introduced into said bed at a temperature of within the range of about 500°F to about 1,200°F.

5. The method of claim 4 wherein the temperature of the fluidized bed is maintained within the range of about 130°F to about 160°F.

6. The method of claim 1 wherein the fluidizing gas is air.

7. The method of claim 1 wherein the fluidizing gas is air in mixture with hot combustion products produced by burning a fluid fuel with a free-oxygen containing gas.

8. The method of claim 1 wherein the ratio of height to area of the fluidized bed is within the range of about 1 ft./12 sq. ft. to about 1 ft./24 sq. ft.

9. The method of claim 1 wherein the length of time to which the pellets are exposed to drying conditions in the first step is substantially shorter than in the subsequent step.

10. The method of claim 9 wherein the time of exposure in the first step is within the range of about 5 minutes to about 10 minutes and the time of exposure in the subsequent step is within the range of about 20 minutes to about 30 minutes.

11. The method of claim 1 wherein the pellets are heated to a temperature within the range of about 250°F to about 500°F during said subsequent step.

12. The method of claim 1 wherein the depth of the fluidized bed of wet pellets is maintained within the range of about 6 to about 12 inches.

* * * * *